(12) United States Patent
Tucker

(10) Patent No.: US 12,559,402 B1
(45) Date of Patent: Feb. 24, 2026

(54) SLUDGE REMOVAL SYSTEM AND METHOD OF USE

(71) Applicant: Dallas C. Jewel Tucker, McKinney, TX (US)

(72) Inventor: Dallas C. Jewel Tucker, McKinney, TX (US)

( * ) Notice: Subject to any disclaimer, the term of this patent is extended or adjusted under 35 U.S.C. 154(b) by 667 days.

(21) Appl. No.: 18/090,183

(22) Filed: Dec. 28, 2022

Related U.S. Application Data

(63) Continuation of application No. 17/727,222, filed on Apr. 22, 2022, now abandoned.

(60) Provisional application No. 63/234,100, filed on Aug. 17, 2021.

(51) Int. Cl.
| | |
|---|---|
| *C02F 9/00* | (2023.01) |
| *C02F 1/00* | (2023.01) |
| *C02F 1/42* | (2023.01) |
| *C02F 11/121* | (2019.01) |
| *C02F 101/32* | (2006.01) |

(52) U.S. Cl.
CPC ............... *C02F 9/00* (2013.01); *C02F 1/004* (2013.01); *C02F 2001/007* (2013.01); *C02F 1/42* (2013.01); *C02F 11/121* (2013.01); *C02F 2101/32* (2013.01); *C02F 2303/04* (2013.01)

(58) Field of Classification Search
CPC .... C02F 9/00; C02F 1/004; C02F 1/42; C02F 11/121; C02F 2001/007; C02F 2101/32; C02F 2303/04
USPC ...... 210/202, 170.02, 170.08, 170.09, 172.4, 210/198.1, 258, 263, 416.1, 416.2, 525, 210/167.1, 11–167, 15–167.17
See application file for complete search history.

(56) References Cited

U.S. PATENT DOCUMENTS 5,293,887 A * 3/1994 Thibodeaux ............ B08B 9/093
239/743

* cited by examiner

*Primary Examiner* — Madeline Gonzalez
(74) *Attorney, Agent, or Firm* — Richard Eldredge; Leavitt Eldredge Law Firm

(57) ABSTRACT

A sludge removal apparatus includes a capturing head extending from a first side to a second side; a fluid line extending from a fluid source to the capturing head, the fluid line to transport water and one or more chemicals; a fluid removal line extending from the capturing head to a filtering system, the fluid removal line having one or more submersible pumps positioned within the capturing head to pump sludge through the fluid removal line; and one or more sprayers positioned at a front of the capturing head and in fluid communication with the fluid line; the water and one or more chemicals are sprayed through the one or more sprayers to break up the sludge; and the sludge is transported to the filtering system after being broken up.

10 Claims, 3 Drawing Sheets

103

301    303

305    307

111    109

103

303    301

403    405

401

SLUDGE REMOVAL SYSTEM AND METHOD OF USE

BACKGROUND

1. Field of the Invention

The present invention relates generally to water cleaning systems, and more specifically, to a sludge removal system for removing sludge from produced water, specifically in a water storage system, for filtering.

2. Description of Related Art

Sludge is a common byproduct of many uses of water, and consists of oils, oxidized metals, sand, and other particulates. This sludge needs to be removed from produced water in order to reuse the water in one manner or another. Conventional systems may transfer al of the water and sludge through a filtering system to filter out the contaminants. There is room for improvement in this area based on increasing efficiency, increasing quality of filtering, and the like.

Accordingly, although great strides have been made in the area of water cleaning systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
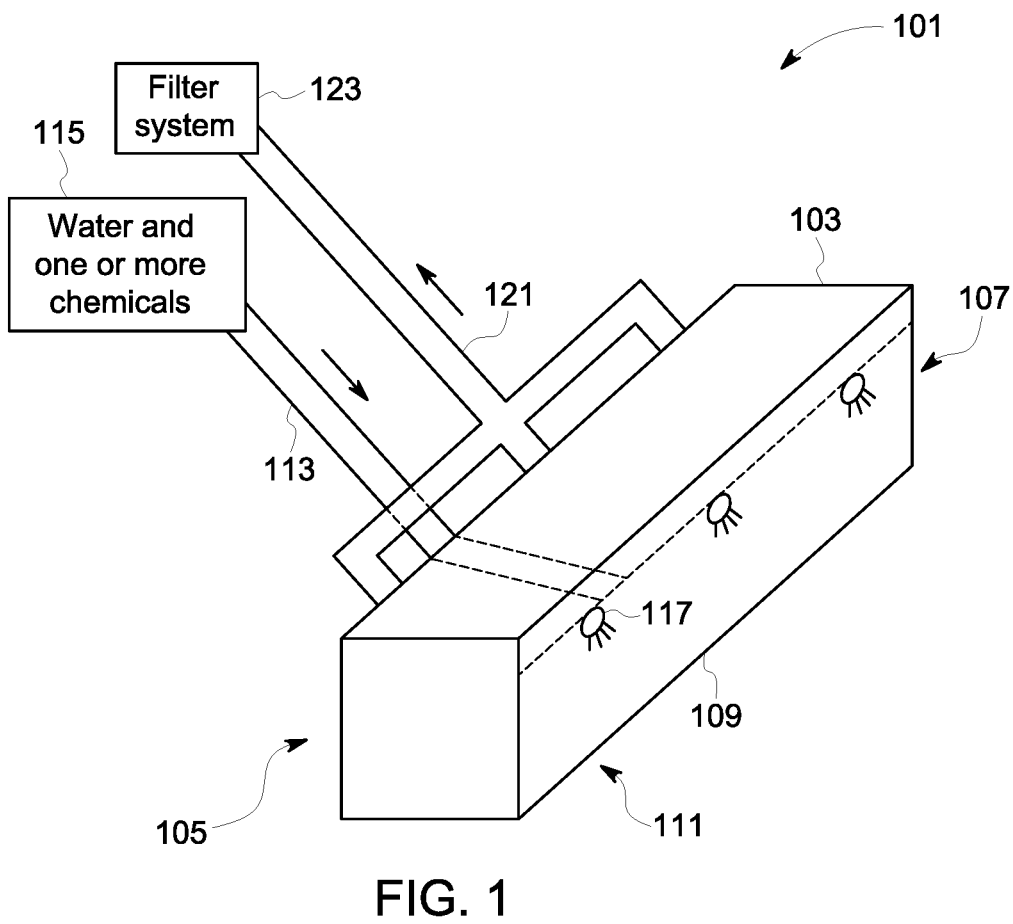
FIG. 1 is an isometric view of a capturing head of a sludge removal apparatus in accordance with the present application.
Figure 2:
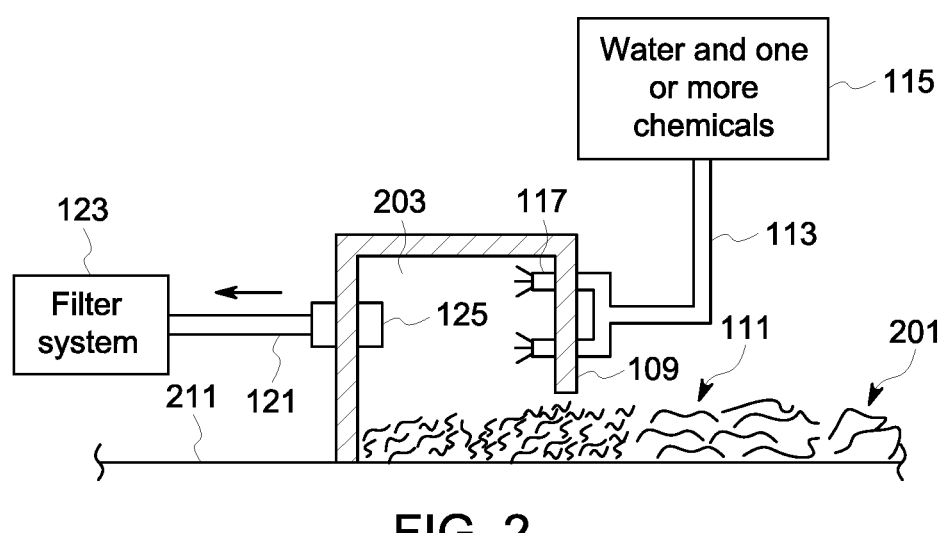
FIG. 2 is a side cross sectional view of the capturing head of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional water cleaning systems. Specifically, the present invention provides for an improved sludge removal and filtration system for produced water. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-4 depict various views of a capturing head and associated equipment as part of a sludge removal apparatus in accordance with the present application. It will be appreciated that the apparatus 101 overcomes one or more of the above-listed problems commonly associated with conventional water cleaning systems.

In the contemplated embodiment, apparatus 101 includes a capturing head 103 extending from a first side 105 to a second side 107. It should be appreciated that the capturing head can vary in dimensions and materials as needed for aesthetical, functional, or manufacturing considerations. Further, in the preferred embodiment, a front 109 extends only partially to a ground surface 211, thereby providing an opening 111 through which sludge 201 is collected into an interior area 203 of the capturing head.

Apparatus 101 further includes a fluid line 113 extending from a fluid source 115 to the capturing head, the fluid line configured to transport water and one or more chemicals to the interior area 203 of the capturing head. In the preferred embodiment, the fluid line 113 travels to one or more sprayers 117 which are positioned at the front of the interior area and at a desired angle to allow for lifting sludge from the base of the tank/lined pond and directing to one or more pumps.

Apparatus 101 further includes a fluid removal line 121 extending from the capturing head to a filtering system 123, the fluid removal line having one or more submersible pumps 125 positioned within the capturing head and configured to pump sludge through the fluid removal line and back to the filtering system.

Figures 3, 4:
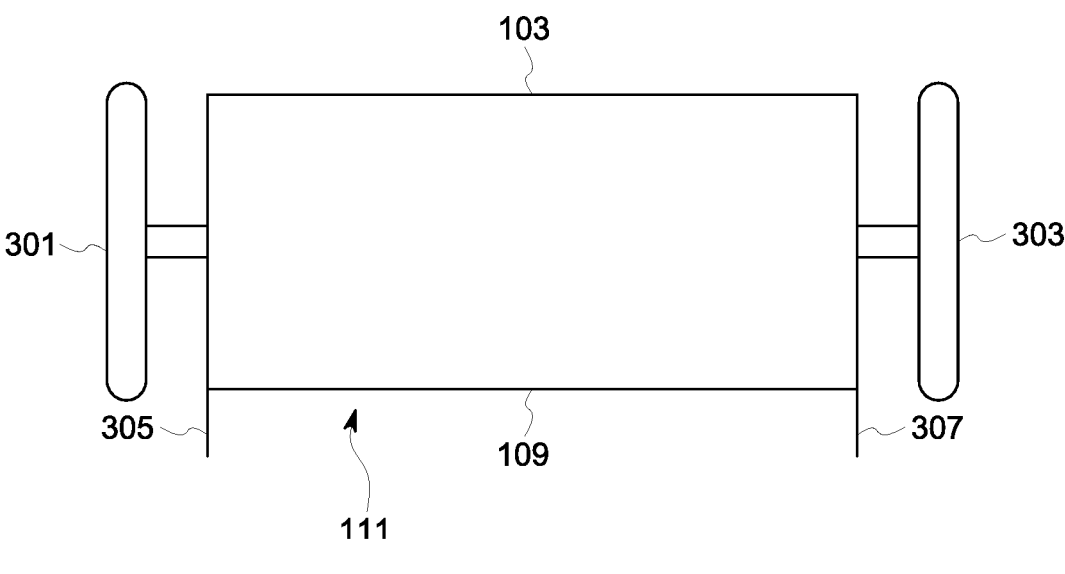
FIG. 3 is a front view of the capturing head of FIG. 1.
FIG. 4 is a back view of the capturing head of FIG. 1.

As shown in FIG. 3, capturing head 103 can include a first wheel 301 and a second wheel 303 attached to the sides of the capturing head, thereby allowing for movement of the capturing head along the ground surface. Hydraulic or mechanical power can be utilized to turn the wheels and control the rate of speed in which the capturing head travels across the floor of the tank/lined pond.

Further shown is opening 111 that extends from the first side to the second side to allow for entry of the sludge into the capturing head. Further shown, is a skirting 305, 307 that extends from the sides of the capturing head and down to the ground surface, thereby blocking off the interior area of the capturing head except for opening 111. The skirting 305, 307 should be semi rigid yet able to flex up and down to keep a tight seal on the surface of the floor and not allow suspended particles to exit the capture chamber of the capture head.

In FIG. 4 a back view of capturing head 103 is shown, wherein a back skirting 401 extends to the ground surface, thereby again keeping the sludge within the interior area of the capturing head. Again, this skirting 401 should be semi rigid yet able to flex up and down to keep a tight seal on the surface of the floor and not allow suspended particles to exit the capture chamber of the capture head. Further shown are the locations 403, 405 of one or more submersible pumps as discussed above. It should be appreciated that the locations 403, 405 can vary, and in addition, there can be additional pumps as desired.

It should be appreciated that one of the unique features believed characteristic of the present application is the configuration of apparatus 101 to provide a convenient means to remove and filter sludge from produced water. Apparatus 101 can be mounted on a trailer for mobile applications and can be used on any size storage vessel, storage pit, or lined pond. The sludge is captured by pumping high pressure water through the capturing head via the fluid line 113 while the capturing head moves slowly across the ground surface. In some embodiments, one or more chemical additives are also injected with the water through the fluid line, the one or more chemical additives being configured to help aid in the break up of any oil or hydrocarbon compounds and for disinfection of bacterial on the base of the vessel. In some embodiments, injection of a biocide is used to eliminate bacteria and greatly reduce the development of hydrogen sulfide gas and greatly slow the deterioration of the material lining the pond or used to construct the tank.

Once the sludge is broken apart and bacteria is killed, the suspended particles within the capturing head are pumped via the one or more submersible pumps and fluid removal line to the filtering system, which will be discussed herein. After filtering, the clean water is pumped under high pressure back to the capturing head to continue the process, while oil, sand, heavy metals, and other contaminates captured during the process are the disposed of in accordance with government standards.

Figure 5:
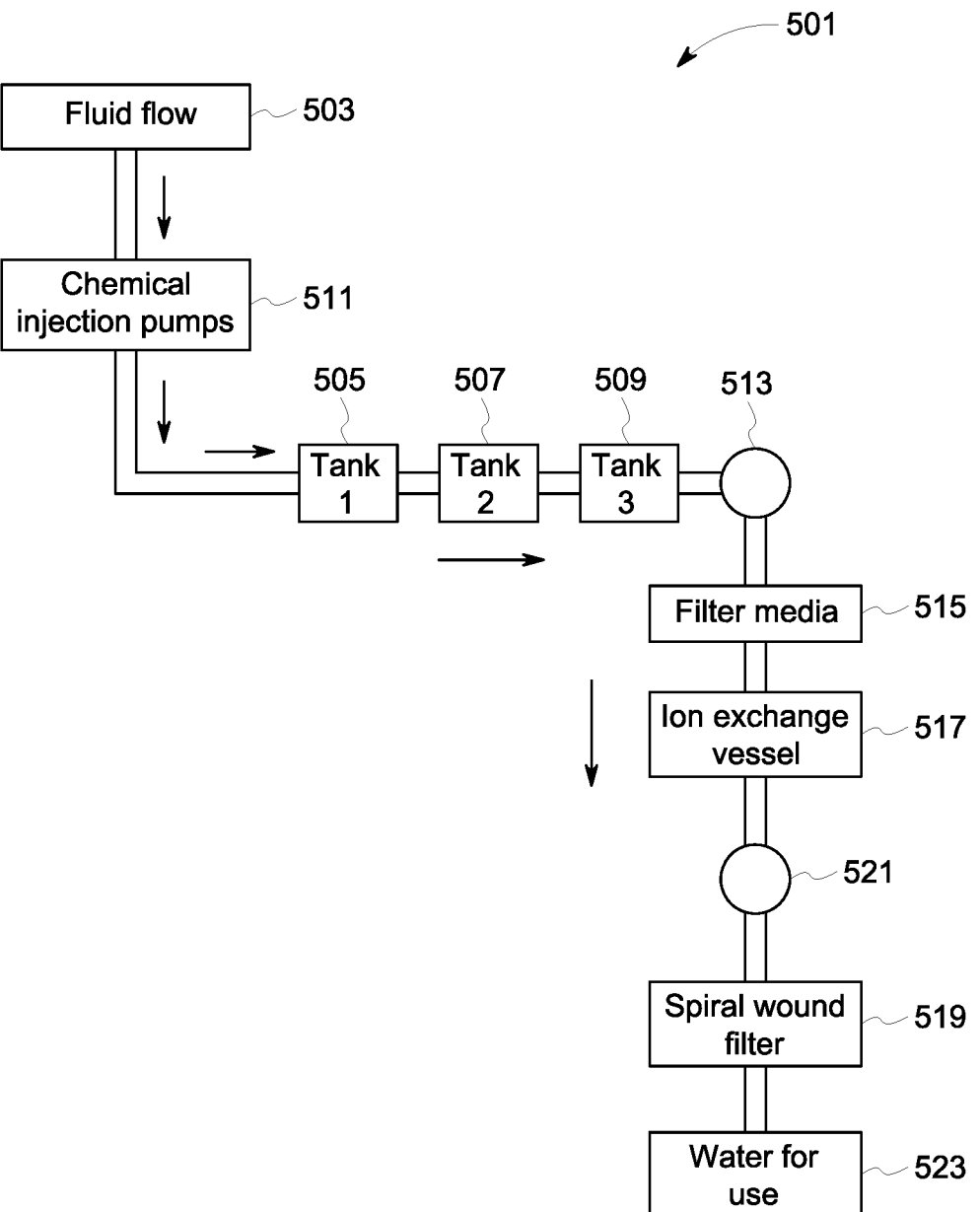
FIG. 5 is a schematic of the filtering system of the present application.

In FIG. 5, a schematic depicts the features of a filtering system 501 in accordance with the present application. It should be appreciated that the filtering system is configured to receive the sludge and water from the sludge capturing apparatus for filtering and cleaning.

System 501 includes fluid flow 503 received from the capturing head, wherein the fluid flow 503 travels through a filtration system having a series of tanks 505, 507, 509, the series of tanks configured to allow for particulates to settle. In some embodiments, one or more chemical injection pumps 511 may be used to provide additives at the beginning of the filtration process, such as for bacterial elimination and the settling process.

The filtration system further includes a first pump 513 in fluid communication with the series of tanks, the pump configured to create a desired flow rate and desired pressure. A filter media 515 is in fluid communication with the pump 513, the filter media configured to remove suspended solids in the fluid flow. In some embodiments, an ion exchange vessel 517 in fluid communication with the filter media and configured to receive the fluid flow therefrom. The ion exchange vessel configured to aid in removal of some elemental compounds.

As shown, the system can further include a spiral wound filter 519 configured to receive the fluid flow from the filter media via a second pump 521, the spiral wound filter configured to further reduce particulars within the fluid flow. The result is cleaned water 523 for reuse in the system.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

The invention claimed is:

1. A sludge removal apparatus, comprising:
   a capturing head extending from a first side to a second side;
   a fluid line extending from a fluid source to the capturing head, the fluid line configured to transport water and one or more chemicals;
   a fluid removal line extending from the capturing head to a filtering system, the fluid removal line having one or more submersible pumps positioned within the capturing head and configured to pump sludge through the fluid removal line; and
   one or more sprayers positioned at a front of the capturing head and in fluid communication with the fluid line;
   wherein the water and one or more chemicals are sprayed through the one or more sprayers to break up the sludge; and
   wherein the sludge is transported to the filtering system after being broken up.

2. The apparatus of claim 1, wherein the capturing head has an opening positioned at a base of the capturing head and extending from the first side to the second side.

3. The apparatus of claim 1, further comprising:
   a first wheel attached to the first side of the capturing head and a second wheel attached to the second side of the capturing head.

4. The apparatus of claim 1, further comprising:
   a back skirting attached to the capturing head and configured to drag along a ground surface when in use.

5. A sludge removal system, comprising:
   a filtration system configured to receive a fluid flow, the filtration system having:
   a series of tanks in fluid communication with the fluid flow, the series of tanks configured to allow for particulates to settle;

a first pump in fluid communication with the series of tanks, the pump configured to create a desired flow rate and desired pressure;

a filter media in fluid communication with the pump, the filter media configured to remove suspended solids in the fluid flow; and a spiral wound filter configured to receive the fluid flow from the filter media via a second pump, the spiral wound filter configured to further reduce particulars within the fluid flow; and a sludge removal apparatus configured to pump the fluid flow to the filtration system, the sludge removal apparatus having:

a capturing head extending from a first side to a second side;

a fluid line extending from a fluid source to the capturing head, the fluid line configured to transport water and one or more chemicals;

a fluid removal line extending from the capturing head to the filtration system, the fluid removal line having one or more submersible pumps positioned within the capturing head and configured to pump sludge through the fluid removal line; and one or more sprayers positioned at a front of the capturing head and in fluid communication with the fluid line;

wherein the water and one or more chemicals are sprayed through the one or more sprayers to break up the sludge; and wherein the sludge is transported to the filtration system after being broken up and collected by the sludge removal apparatus.

6. The system of claim 5, wherein the filtration system further comprises:

an ion exchange vessel in fluid communication with the filter media and configured to receive the fluid flow therefrom.

7. The system of claim 5, further comprising:

a chemical injection pump configured to inject one or more chemicals at the source inlet into the fluid flow.

8. The system of claim 5, wherein the capturing head has an opening positioned at a base of the capturing head and extending from the first side to the second side.

9. The system of claim 5, further comprising:

a first wheel attached to the first side of the capturing head and a second wheel attached to the second side of the capturing head.

10. The system of claim 5, further comprising:

a back skirting attached to the capturing head and configured to drag along a ground surface when in use.

* * * * *